Aug. 24, 1926.
H. KLOPSTOCK
1,596,978
CUTTING TOOL SUCH AS IS USED FOR PLANING, TURNING, OR FINISHING BLANKS OF METAL OR OTHER MATERIAL
Filed Jan. 9, 1924

Inventor:
Hans Klopstock
By his Att'y P.H.Richards

Witnesses:
Achilles Rovegno

Patented Aug. 24, 1926.

1,596,978

UNITED STATES PATENT OFFICE.

HANS KLOPSTOCK, OF BERLIN, GERMANY.

CUTTING TOOL SUCH AS IS USED FOR PLANING, TURNING, OR FINISHING BLANKS OF METAL OR OTHER MATERIAL.

Application filed January 9, 1924, Serial No. 685,201, and in Germany October 17, 1923.

My invention relates to improvements in cutting tools.

The principal object of my invention is to reduce the power required for detaching the cutting or chip and to reduce the heat generated by the cutting of the blank.

Other objects of the invention will appear herein later.

With these objects in view, my invention consists in the improvement in cutting tools hereinafter specified.

While I shall illustrate my invention by the best embodiment thereof known to me, such embodiment is typical only of many possible forms in which the invention can be embodied, and my invention is not to be restricted thereto.

The value of a cutting edge for tools for planing, turning or otherwise finishing blanks of metal and other materials is determined by the power required in turning, planing and so forth, and by the length of its life, i. e., its ability to stand up in severe service without breaking or becoming dull, and by its resultant increased output. The use of a large breast angle, i. e., the vertical angle formed by the end face or clearance surface of the tool with the upper or lip surface thereof, strengthens the cutting edge, but, with the tools used heretofore, results in greater power requirements for the same amount of work done and in the generation of excessive heat, due to causes mentioned below, which is detrimental to the cutting edge. On the other hand, lower power requirements with the tools used heretofore have been secured by using a small breast angle, but this greatly interfered with the life of the cutting edge, mainly on account of its mechanical weakness due to this small angle and to the lack of sufficient metal to carry the heat away from the cutting edge and prevent its being injured by overheating. The practice sometimes resorted to, of breaking the very edge between the lip and clearance surfaces, by means of a grindstone, does not change the weakness of this form of tool materially.

It has been further suggested to use tools which in shape are duplicates of worn tools, in other words, which embody in the lip surface a depression like that in time produced in this surface by the chip. But this expedient does not insure highest cutting efficiency, as my extensive investigations have shown and as will be realized from the most salient results of these investigations which will be mentioned below and which have led to the present invention.

Referring now to the accompanying drawings.

Figure 3:
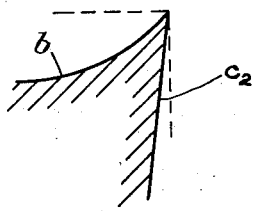
Fig. 3 is a similar section taken on the line 3—3 of Fig. 1.
Figure 3A:
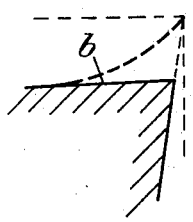

Fig. 3ª is a similar section showing a modification.

Figure 1:
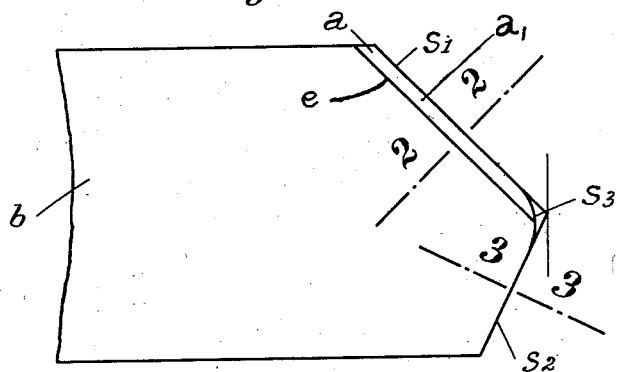
Fig. 1 is a plan view of the front or cutting portion of a tool embodying my invention.
Figure 2:
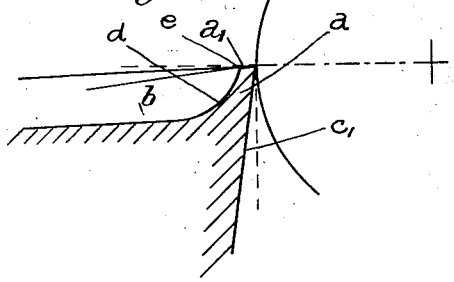
Fig. 2 is a section taken on the line 2—2 of Fig. 1.

The tool shown in Figs. 1, 2 and 3 has front and rear cutting edges, respectively $S_1$ and $S_2$, which are formed by the meeting of their respective clearance surfaces $c_1$ and $c_2$ with the surfaces forming the upper face of the tool. The cutting edge $S_1$ is carried by a strip $a$ of metal on the tool, having a lip surface $a_1$, the said strip being formed by a depression $b$ in the upper face of the tool. The bottom of the depression preferably merges into the rear surface of the strip by a fillet $d$. This forms a shoulder $e$ at the rear edge of the raised strip $a$. Thus there is left a substantial, though limited, strip of lip surface $a_1$ adjacent to the cutting edge, and there is formed a shoulder $e$ at the back of said lip surface where the lip surface and the wall of the depression meet.

While the strip $a$ in this particular form of the tool, which is intended more for a finishing cut than for a roughing cut, extends over substantially the whole of the active portion of the cutting edges, it does not extend along the whole of the cutting edge $S_2$. This is because the said cutting edge takes no active part in the making of the finishing cut. But the principles of my invention illustrated therein can be applied to tools for roughing cuts with even greater advantage. The strip $a$ is preferably of substantially uniform width throughout its entire length, or at least throughout the active part of the cutting edge. Its width is preferably such as to separate the cutting from the work and bend it away from the work without excessively compressing it. The strip, when thus formed, has sufficient metal to carry away the heat of the cutting operation sufficiently fast, so that the edge will not be injured thereby.

The breast angle, i. e., the vertical angle between the plane of the raised strip $a$ and the clearance surface $c_1$ or end surface of the tool, which with the lip surface forms the cutting edge, can, according to my invention, be made larger than has heretofore been possible without detriment.

In order to clearly explain wherein the action of my cutting tool differs essentially from that of previous tools, it is necessary to enter more fully into the process of cutting based on years of scientific investigations which I have conducted.

A chip or cutting in what is generally called metal cutting is formed by a large number of individual chip elements broken off the work-piece and having a more or less solid connection among themselves. The process of turning, for example, consists in separating, consecutively, these individual chip elements from the work-piece, and in leading off the resulting cutting formed by the connected chips. The process of separating the individual chip elements, as my long investigations have shown, consists mainly in four operations: first, an initial compression of material in front of the tool, which has remained after the previous chip element has been broken off; second, in starting a slight initial tear between the main part of the work-piece and the small part which is to form the chip element; third, in compressing and bending this small part; and, fourth, in breaking it off the work-piece, except for a partial connection remaining between it and the part which is to form the next chip element. The problem is to effect the separation with as little compression as possible, since the latter increases the power requirements and the heat produced, and to do so without sacrificing the life of the cutting edge.

With tools of long life as used heretofore, i. e., tools having large breast angles, a large compression of the chip element before it will separate from the work-piece is unavoidable, for the reason that with these tools the force tending to break off the chip element is working under very unfavorable conditions.

In connection with the second main part of the turning process, namely, the disposal of the chip, large breast angle tools as used heretofore are also inefficient, since, generally speaking, the friction between the chip and the lip or upper surface of the tool increases with the size of the breast angle. This friction increases the power requirements and the heat produced.

My invention aims to produce a tool having the advantages of the large breast or "contained" angle but working at the same time with high efficiency in breaking off the chip elements and leading off the chip. It embodies a large breast angle, and consequently a cutting edge which is mechanically strong, and a special form of lip surface which is of such a form that it will assist in breaking off the chip elements without excessive compression and to avoid interference with the free flow of the complete cutting sufficiently so as not greatly to wear the tool or compress the cutting.

In tools used heretofore employing unbroken lip surfaces adjacent to the cutting edges, it has been observed, particularly in heavy roughing work, that cavities develop within the lip surface, such cavities beginning near the cutting edge. I have, as a result of my observations, developed the tool above described, embodying a lip surface consisting of a narrow raised strip adjacent to the cutting edge and extending over its entire active length, and of a depressed part of sufficient dimensions, in the direction of the flow of the chip, to guide the latter without undue friction or interference.

I have found that it is advisable to connect the depressed part with the raised strip by means of a fillet in such a manner that the angle formed by the surface of the raised strip and a surface tangential to the fillet at its intersecting point with the strip surface will not become too small, even after several regrindings of the strip surface. The most advantageous width of the raised strip varies, according to my investigations, with the size of the chip, but even with very heavy work it should—on the basis of present materials—be less than one-eighth of an inch. The extension of the depressed part of the lip surface should, as I have found, be large in comparison to the difference in level between the raised strip and the depressed part, which difference, for best operating efficiency, strength, heat conduction and also for other reasons, must be kept within moderate dimensions. The exact form of the depressed surface, however, is not vital; it may be straight, slightly concave, and slanting slightly in one or the other direction, without materially affecting the result.

Since my form of lip surface as described changes materially the inter-action of chip elements, chip and lip surface, I am enabled to use, with many kinds of work, larger breast angles than generally practicable heretofore, with the beneficial results indicated before.

The peculiar function of the raised strip, of the depressed part of the lip surface, and of the shoulder formed by the intersection of the strip surface and the fillet will be apparent from what has been said before. After the initial rift caused as the result of the wedge action of the edge formed by the raised strip and the clearance surface, the metal to be separated is bent and slides away from the cutting edge. It is apparent that with proper width of the raised strip its shoulder will help in breaking off the small part of the work-piece adjacent to the tool, and in fact the observation in tests and practical operations confirm this; with a raised strip of proper width and a properly designed fillet the wear on these tools begins at the shoulder of the raised strip, i. e., at the line where the depression begins. A further advantage of the depression $b$ is clear from the illustration. The individual chip elements, jointly forming the chip, find little resistance from and easy guidance by the depressed surface if the same extends far enough.

From the above it will be clear that best results will be secured if the raised strip extends over substantially the whole active part of the cutting edge.

In all these cases, however, the raised strip should be of substantially equal width along the whole active cutting edge, preferably less than one-eighth inch wide. The depression should be of sufficient dimensions, in the direction of the motion of the chip, to permit its free flow, and the depressed portion should be joined to the raised strip by means of a fillet. These are characteristics of my invention.

The primary functions of the depression are to form the shoulder $e$ and to avoid the presence of metal which would unduly interfere with the flow of the chip or cutting. Thus, so long as the strip $a$ be present with sufficient metal to carry away heat from the cutting edge and with an upper surface and shoulder, to make the initial rift and, deflect the chip without undue compression, and so long as no metal is present to thereafter cause heat and wear by unduly opposing the flow of the cutting, it is not essential to my invention whether any depression as such be present.

My experiments and the use of my tools in general daily factory use have proven beyond doubt that, on the basis of equal lasting qualities and on the basis of equal power requirements, my cutting edge will, with some materials, remove, in a given time, an amount of material exceeding that removed with conventional tools, by thirty to fifty or more per cent, depending on the conditions.

In addition, I have found that some materials which were extremely hard to work heretofore can be worked with my cutting edge with much less difficulty.

Various modifications may be made without departing from the spirit thereof. The present exemplification is to be taken as illustrative and not as limitative.

I claim:

1. A cutting tool, the upper face of which is composed of a raised strip carrying a cutting edge, and having a shoulder substantially parallel to said cutting edge, of a depressed portion back of said shoulder, and of a fillet connecting the two, said fillet being of a smaller radius than would be worn by a chip in a face without a depression.

2. A cutting tool, having a cutting edge, a strip extending along substantially the whole active portion of said cutting edge and having a shoulder substantially parallel to said cutting edge, the face of the tool adjacent to said strip being depressed back of said shoulder, and there being a fillet connecting said strip and depressed portion, said fillet being of a smaller radius than would be worn by a chip in a face without a depressed portion.

3. A cutting tool, the upper face of which is composed of a raised strip of substantially uniform width and carrying a cutting edge and a shoulder, of a depressed portion and of a fillet connecting the depressed portion with the shoulder, said fillet being of a smaller radius than would be worn by a chip in a face without depression.

4. A cutting tool, having a cutting edge, a strip of substantially uniform width extending along substantially the whole active portion of said cutting edge, said strip having a shoulder, the face of the tool adjacent to said strip being depressed relative thereto, and there being a fillet connecting said shoulder and said depressed portion, said fillet being of a smaller radius than would be worn by a chip in a face without a depressed portion.

5. A cutting tool, the upper face of which is composed of a raised strip carrying a cutting edge, and having a shoulder substantially parallel to said cutting edge, and of a depressed portion back of said strip, the surface adjacent to said shoulder being outside of the curve which would be worn by a chip in a face without a depression.

6. A cutting tool, the upper face of which is composed of a raised strip carrying a cutting edge and having a shoulder substantially parallel with said cutting edge, and of a depressed portion back of said shoulder, the surface adjacent to said shoulder being outside of the curve which would be worn by a chip in a face without a depression, the said strip being of such height that it can be reground without substantially increasing the friction of the chip on the surface back of and adjacent to said strip.

7. A cutting tool, provided with a cutting edge, and having a strip of metal at the back of said edge, said strip having a shoulder substantially parallel to said cutting edge, and a depression back of said strip, said strip being large enough to sufficiently carry away the heat of the cutting operation so that the edge shall not be injured thereby, the surface of said depression adjacent to said shoulder being outside of the curve which would be worn by a chip in a face without a depression.

8. A cutting tool, having angularly disposed front and rear cutting edges, a raised strip along one of said cutting edges, said strip having a shoulder substantially parallel to said cutting edge, and a depression back of said strip and substantially coinciding with the other of said cutting edges, the surface adjacent to said shoulder being outside of the curve which would be worn in a face without a depression.

9. A cutting tool, the upper face of which is composed of a raised strip carrying a cutting edge, and having a shoulder substantially parallel to said cutting edge and of a depressed portion back of said strip, the surface of said depressed portion adjacent to said shoulder being sufficiently low so that wear will occur principally upon said shoulder and not to a substantial extent upon an adjacent portion of said depression.

10. A cutting tool, the upper face of which is composed of a raised strip carrying a cutting edge and having a shoulder substantially parallel to said cutting edge, and of a depressed portion back of said strip, a portion of the surface adjacent to said shoulder being so placed relative to the path of the cutting as to afford substantial clearance.

11. A cutting tool the upper face of which is composed of a raised strip carrying a cutting edge and having a shoulder substantially parallel to said cutting edge, and of a depressed portion back of said strip, the width of the strip and the shape of the depression being such that the shoulder will assist in breaking the chip from the work and the chip will flow away without substantial resistance otherwise than at the strip.

In testimony whereof I hereunto affix my signature.

HANS KLOPSTOCK.